United States Patent [19]

Etoh et al.

[11] Patent Number: 4,676,209
[45] Date of Patent: Jun. 30, 1987

[54] TRANSFER PASSAGE ARRANGEMENT FOR DIESEL ENGINE HAVING SWIRL CHAMBER

[75] Inventors: Yukihiro Etoh, Yokohama; Kunihiko Sugihara, Tokyo; Giichi Shioyama, Yokosuka; Toshiaki Tanaka, Chigasaki; Yoshihisa Kawamura, Yokosuka, all of Japan

[73] Assignee: Nissan Motor Co., Ltd., Yokohama, Japan

[21] Appl. No.: 741,631

[22] Filed: Jun. 5, 1985

[30] Foreign Application Priority Data

| Jun. 7, 1984 | [JP] | Japan | 59-117288 |
| Jun. 7, 1984 | [JP] | Japan | 59-117287 |
| Jun. 7, 1984 | [JP] | Japan | 59-117289 |
| Jul. 31, 1984 | [JP] | Japan | 59-117530[U] |

[51] Int. Cl.$^4$ .................. F02B 19/08; F02B 19/18
[52] U.S. Cl. .................. 123/293; 123/262; 123/269
[58] Field of Search .............. 123/261, 262, 263, 268, 123/269, 275, 281, 285, 286, 293

[56] References Cited

U.S. PATENT DOCUMENTS

| 3,044,454 | 7/1962 | Sutton | 123/263 |
| 4,270,499 | 6/1981 | Frelund | 123/293 |
| 4,292,937 | 10/1981 | Vallaude | 123/269 X |
| 4,323,039 | 4/1982 | Tsugekawa et al. | 123/281 X |
| 4,534,327 | 8/1985 | Latsch et al. | 123/293 X |
| 4,541,375 | 9/1985 | Tanaka | 123/293 X |

FOREIGN PATENT DOCUMENTS 0165625 10/1982 Japan .................. 123/293

Primary Examiner—Willis R. Wolfe, Jr.
Attorney, Agent, or Firm—Schwartz, Jeffery, Schwaab, Mack, Blumenthal & Evans

[57] ABSTRACT

In order to avoid the formation of smoke and HC when the compression ratio of a swirl chamber type Diesel engine is lowered either by design or by operation in rarified atmospheres, the fuel injector is located on one side of the center axis of the swirl chamber so as to maximize the distance for which the injected fuel can travel before contacting a wall of the chamber and the auxiliary transfer port through which a fraction of the injected fuel is fed to the main combution chamber is arranged so that the axis thereof intersects the axis of the fuel injector and therefore the trajectory along which fuel is injected, at a point defined within the swirl chamber per se and on the opposite side of the center axis with respect to the fuel injector.

6 Claims, 14 Drawing Figures

TRANSFER PASSAGE ARRANGEMENT FOR DIESEL ENGINE HAVING SWIRL CHAMBER

BACKGROUND OF THE PRESENT INVENTION

1. Field of the Invention

The present invention relates generally to a Diesel cycle internal combustion engine and more specifically to a Diesel cycle internal combustion engine of the type equipped with a swirl chamber which communicates with the main combustion chamber via main and auxiliary transfer ports.

2. Description of the Prior Art

FIGS. 1 and 2 show a prior art arrangement of the type disclosed in Japanese Patent Application Provisional Publication No. Sho 57-179329. In this arrangement a cavity is formed in cylinder head 1. As shown in these Figures the cavity is arranged to have an essentially cylindrical shape, viz., include a right cylindrical face 2A and two essentially flat side walls 2B, 2C. A plug or mouth ring 3 is disposed in the cavity in a manner to close same and define a swirl chamber 4. The plug is formed with main and auxiliary transfer ports 5, 6. The main transfer port 5 is arranged to introduce the charge compressed in the combustion chamber 7 into swirl chamber 4 in a manner that it undergoes a swirling motion as indicated by arrows A.

Fuel injector 8 is arranged to inject fuel into the swirl chamber 4. In this arrangement the injector 8 is arranged to inject fuel along a trajectory which is aimed at the mouth of the auxiliary transfer port 6 so as to cause a fraction of the fuel injected into the swirl chamber 4 to pass through the auxiliary transfer port 6 into the main combustion chamber 7. This distribution of the fuel between the main combustion chamber 7 and the swirl chamber 4 reduces the amount of fuel which undergoes spontaneous combustion in the swirl chamber per se and thus reduces the peak combustion temperature and the amount of NOx formed.

However, this arrangement suffers from the drawback that if the compression ratio of the engine is reduced for the purposes of reducing engine noise or by temporary operation at relatively high altitudes, the reduced amount of gas contained in the swirl chamber 4 at the time when the fuel is injected permits the fuel to penetrate further through the swirl chamber 4 than desirable and actually impinge on the walls of the swirl chamber wetting same particularly around the mouth of the auxiliary transfer port 6. This unsuspended fuel tends to combust more slowly than the portion which is well mixed with air and thus tends to increase the HC and smoke emissions of the engine.

This arrangement further suffers from the drawback that when the above type of swirl chamber is used in combination with a flame dispersing cavity 9 formed in the piston crown (see FIG. 5 by way of example) under the above mentioned conditions wherein the compression ratio of the engine is intentionally lowered for the purposes of reducing engine noise and weight or due to the operation thereof in mountainous areas or the like, an increased amount of fuel tends to find its way through to the elongate trench portion formed between the two essentially circular flame dispersion sections. Accordingly, as this fuel tends to be mixed with an amount of air insufficient to entrain and support complete combustion thereof, further increases in smoke and HC tend to occur.

SUMMARY OF THE INVENTION

It is an object of the present invention to provide a transfer passage arrangement for a Diesel engine equipped with a swirl chamber which enables the compression ratio the engine to be lowered either by design or by the operation of the engine in an environment wherein the atmospheric air pressure is relatively low.

In brief, the above object is achieved by an arrangement wherein in order to avoid the formation of smoke and HC when the compression ratio of a swirl chamber type Diesel engine is lowered either by design or by operation in rarified atmospheres, the fuel injector is located on one side of the center axis of the swirl chamber so as to maximize the distance for which the injected fuel can travel before contacting a wall of the chamber and the auxiliary tranfer port through which a fraction of the injected fuel is fed to the main combution chamber is arranged so that the axis thereof intersects the axis of the fuel injector and therefore the trajectory along which fuel is injected, at a point defined within the swirl chamber per se and on the opposite side of the center axis with respect to the fuel injector.

More specifically a first aspect of the present invention comes in an internal combustion engine which includes: a cylinder bore; a piston disposed in the cylinder bore in a manner to define a variable volume combustion chamber; a swirl chamber, the swirl chamber having two opposite essentially parallel flat sides bounded by a hemi-cylindrical wall portion; a main transfer port providing fluid communication between the swirl chamber and the main combustion chamber, the main transfer port being arranged to lead the gas compressed in the combustion chamber during the compression phase of the engine tangentially into the swirl chamber so that the gas swirls in a predetermined rotational direction therein; means defining a swirl chamber center axis, the center axis extending through a center portion of the swirl chamber parallel to the flat side walls and in a manner to intersect the hemi-cylindrical wall portion; a fuel injector for injecting fuel into the swirl chamber, the fuel injector having an axis and arranged so that a fuel injection nozzle is located upstream of the center axis with respect to the direction in which the gas swirls in the swirl chamber; an auxiliary transfer port leading from the main combustion chamber to the swirl chamber, the auxiliary tranfer port having an axis which intersects the axis of the fuel injector at a point located within the swirl chamber on the downstream side of the center axis.

A further aspect of the present invention comes in the combination with the above of a flame dispersing recess formed in the crown of the piston, and which comprises: an elongate trench; and first and second essentially circular flame dispersing sections located on either side of the trench, the trench having a first deep end located in proximity of the main transfer port and arranged so that the deepest section thereof is located so as to be alinged with an extroplation of the axis of the auxiliary tranfer port when the piston is essentially at its TDC position, the trench tapering to a shallow second end which has a depth approximately equal to the essentially circular flame dispersing portions.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
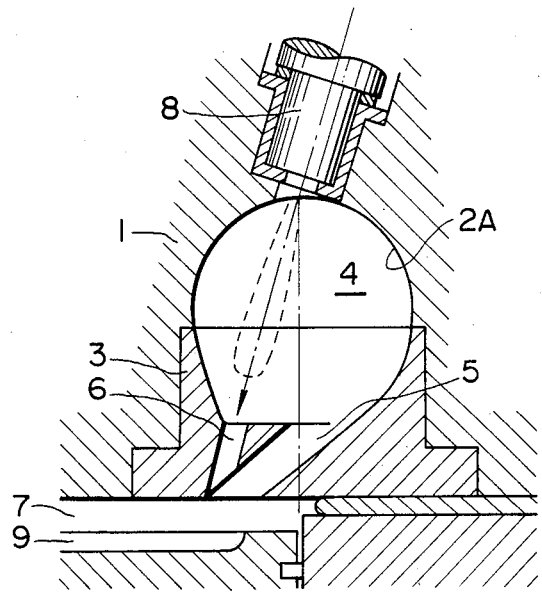
FIGS. 1 and 2 are side and front sectional elevations of the prior art arrangement discussed in the opening paragraphs of the instant disclosure.
Figure 2:
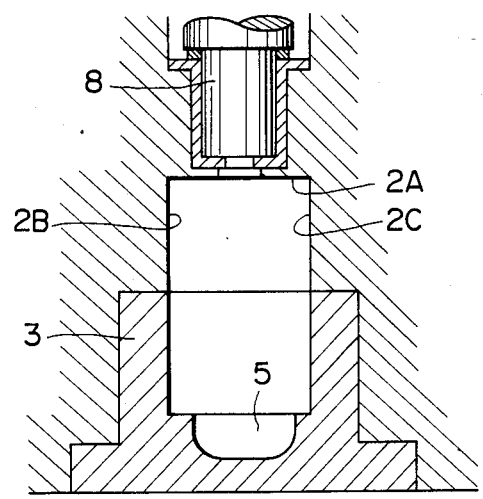
Figure 3:
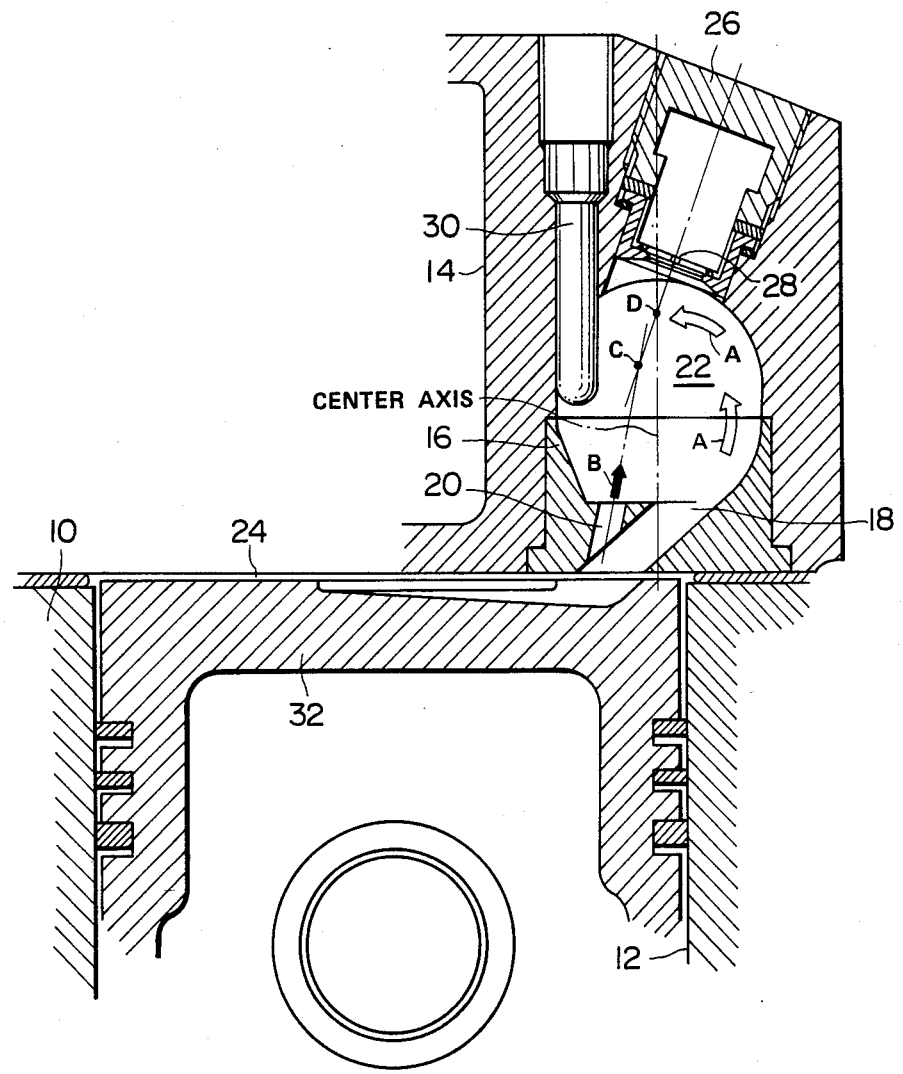
FIG. 3 is a side sectional elevation of a Diesel engine equipped with a first embodiment of the present invention.

FIG. 3 shows in section a Diesel engine equipped with a tranfer passage arrangement according to a first embodiment of the present invention. This arrangement includes a cylinder block 10 in which a cylinder bore 12 is formed and a cylinder head 14 which is detachably fastened to the cylinder block 10 and in which a cavity is formed. As shown, this cavity is closed by a plug 16 in which main and auxiliary transfer ports 18, 20 are formed, in a manner to define a swirl chamber 22. This swirl chamber 22 like the arrangement depicted in FIG. 2 also has essentially flat side walls which are bounded by a hemi-cylindrical upper wall.

The main transfer port 18 is arranged to lead the charge compressed in the main combustion chamber 24 into the swirl chamber 22 so that the flow enters the swirl chamber in a manner to encounter the hemi-cylindrical wall section and thus be guided as shown by the arrows A.

A fuel injector 26 is disposed in the cylinder head 14 and arranged to inject fuel into the swirl chamber along a trajectory which in this embodiment is essentially coincident with the axis of the injector 26. The injection nozzle 28 of the injector 26 is arranged to be located on the upstream side (with respect to the swirling motion within the swirl chamber) of an axis which shall be referred to as the "center axis". This axis passes extends parallel to the essentially flat side walls of the swirl chamber and intersect the upper mid section of the hemi-cylindrical wall surface. In this embodiment the center axis is essentially normal to the plane defined by the interface between the cylinder head 14 and the cylinder block 10. However, it should be noted that this latter feature is not essential and may be varied if so desired. As shown, the axis of the fuel injector intersect the center axis at a point D which is located within the swirl chamber per se.

A glow plug 30 is arranged to project into the swirl chamber 22 proximate the injection trajectory so that a portion of the injected fuel is guided thereagainst the swirling action generated during the induction phase of the engine. Viz., the glow plug 30 is arranged on the side of the center axis opposite to that on which the fuel injection nozzle is located.

The auxiliary tranfer port 20 is arranged in this embodiment to be essentially straight and to have an axis which intersects the axis of the injector at a point C. It should be noted that this point also is located within the swirl chamber and on the side of the center axis opposite to that on which the nozzle 28 of the fuel injector 26 is located. The reason for this design feature will become clear hereinlater.

With the above described arrangement, when the engine is running and enters the compression phase, as the piston rises toward its TDC position, the air compressed in the main combustion chamber 24 by the ascending piston 32 is forced into the swirl chamber 22 as shown by arrows A. As previously described this flow then undergoes deflection and assumes a swirling configuration. Simultaneously, a smaller flow of air enters the swirl chamber 22 via the auxiliary transfer port 20 as shown by the small black arrow B. During this period fuel is injected into the swirl chamber 22. The injected fuel is firstly subject to the influence of "main swirl" produced by the main transfer port and is in part guided against the glow plug 30. Subsequently, a mixture of air and fuel is guided downwardly as seen in the drawings toward a shoulder section formed in plug 16. This mixture then encounters the flow B which tends to produce turbulence and to a degree interfer with the main swirling motion. The fuel is accordingly induced to assume a well carburetted state.

It should be noted that as the fuel injector 26 is arranged so that the fuel may flow a relatively long way before encountering a wall surface of the swirl chamber, the injected fuel is firstly subjectto the main or primary swirl A and then to further agitation by the secondary turbulence generating flow B, even if the engine is operated at high altitudes which reduces the charge density within the swirl chamber and allows the injected fuel to penetrate further through the chamber than normal, or the engine is actually designed to produce a compression ratio which induces the above mentioned phenomenon, then wetting of the walls of the swirl chamber 22 about the mouth of the auxiliary transfer passage 20 is obviated. However, not all of the injected fuel is entrained in the swirl within the swirl chamber and a fraction of same is carried through the auxiliary transfer port 20 under the influence of its own intertia. The fuel actually reaching the main combustion chamber 24 tends to be better atomized than with prior art.

Figure 4:
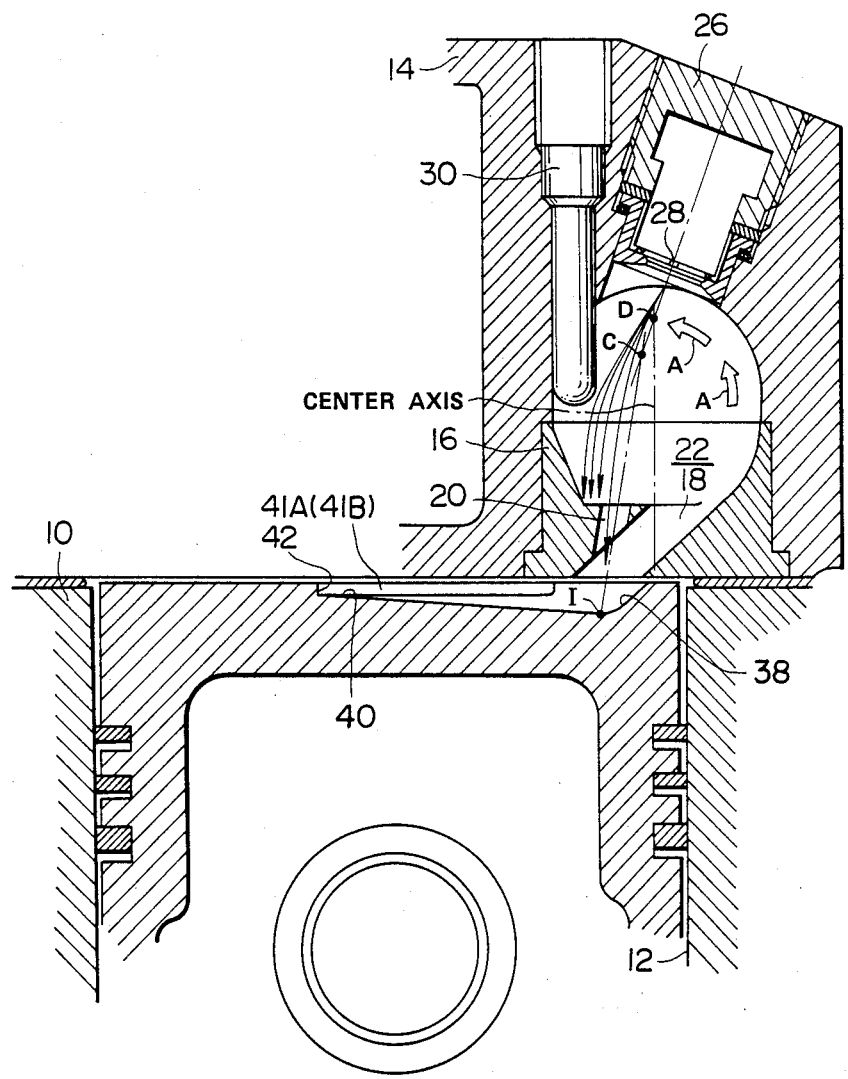
FIG. 4 is view similar to that of FIG. 3 which shows a second embodiment of the present invention.
Figure 5:
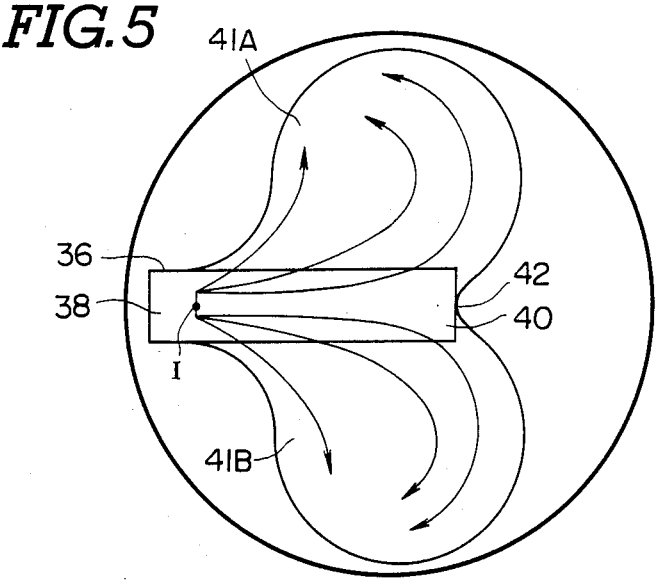
FIG. 5 is a plan view of the crown of the piston shown in FIG. 4 illustrating the shape of the flame dispersing recess formed therein and the flame flow patterns which occur in the main combustion chamber during and expansion phase of the engine.

FIGS. 4 and 5 show a second embodiment of the present invention. This arrangement is essentially similar to the arrangement of the first embodiment however features a flame dispersing arrangement in the piston crown which is arranged in combination with a swirl chamber arrangement essentially identical to that disclosed in connection with FIG. 3 in a manner which further improves the combustion which occurs in the main combustion chamber.

In the prior art, the depth of the elongate trench portion which extends between the first and second circular flame dispersing sections which flank same, is essentially constant so that upon an unexpectely large amount fuel finding its way through the auxiliary transfer passage due to reduced charge density, the mixture located immediately below the mouth of the main transfer passage tends to be poorly carburetted and become richer than normal as the strength of the turbulence in the main combustion chamber is far weaker than that produced in the swirl chamber and tends to wet the walls of the trench.

The second embodiment of the present invention obviates this problem by arranging the trench 36 to have a deep upstream end portion 38 and a shallow downstream end 40 wherein the deepest section of the trench is located so as to coincide with the extrapolation of the axis of the auxiliary transfer port 20 (see point I in FIG. 4). This configuration tends to maximize the amount of air available for mixing with the faction of fuel which enters the main combustion chamber and thus obviate the tendancy for smoke and HC to be formed as a result of relatively slow combustion which occurs due to poor carburetion and/or wetting of the trench 36 with liquid fuel.

Accordingly, as shown in FIG. 5 when the flame is injected into the trench 36 it flares out into the essentially circular flame dispersion sections 41A, 41B carrying with it the fuel which has reached the main combustion chamber and obviates the occurence wherein fuel, which has been permitted to wet the trench, slowly combusts in a manner which tends to produce smoke and the like.

It will be noted that a rounded flow splitting nose portion 42 is provided at the downstream end 40 of the trench 36 to induce the flame propergating therealong undergoes desirably separation into the flame dispersing sections 44, 46 and does not flow out of the flame dispersing recess in a manner which invites quenching of the flame and the formation of smoke and HC.

Figure 6:
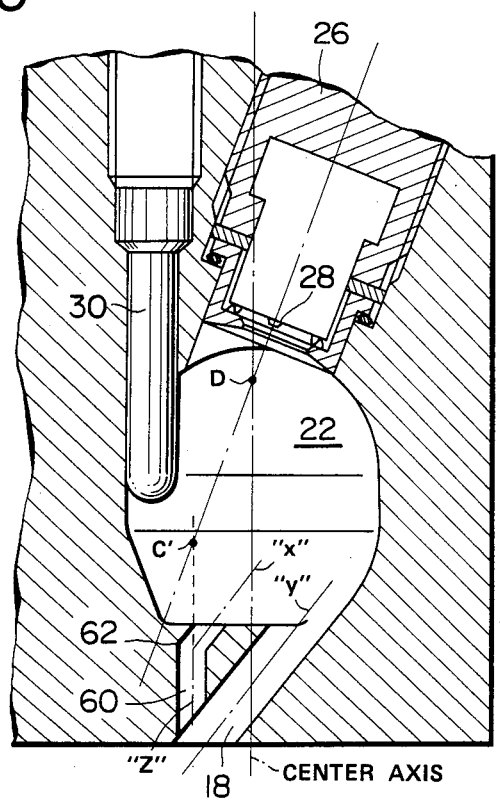
FIG. 6 is a side sectional elevation of a Diesel engine equipped with a third embodiment of the present invention.

FIG. 6 shows a third embodiment of the present invention. In this arrangement the auxiliary transfer passage 60 is arranged to have an elbow 62 and for the axis "x" of the port on the swirl chamber side of the elbow 62 to have an axis which is essentially parallel to the axis "y" of the main transfer port 18. In the illustrated embodiment the portion of the auxiliary transfer port 60 which is located on the main combustion chamber side of the elbow, has an axis "y" which intersect the axis of the injection valve at point C and is also essentially parallel to the center axis. However, it should be noted that this latter mentioned parallel feature is not essential to the present invention and the portion of the auxiliary transfer port located on the main combustion side of the elbow can be oriented in various other directions if so desired (for example so that the axis thereof intersects the deepest section of the flame dispersing trench 36. It should be also noted that it is possible to orient the injector 26 so that the axis thereof intersects the axis of the portion of the auxiliary transfer port 60 which is located on the swirl chamber side of the elbow 62.

According to the present invention the provision of the elbow serves to prevent the phenomenon wherein under low to medium engine load wherein the swirl generated by the main transfer port 18 is relatively weak and the effect of the flow of air which passes through the auxiliary transfer passage sufficient to impair the swirling motion produced in the swirl chamber 22 to the degree that noxious emissions increase, and is instead oriented in a manner which injects the secondary flow into the swirl chamber in a direction which tends to assist the generation of the swirl rather than hinder same.

FIGS. 7A to 7D show various passage arrangements which were evaluated during the development of the instant embodiment. FIG. 8 shows the result of a comparison of the four arrangement plotted in terms of smoke emission.

Figure 7A:
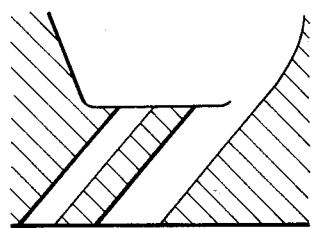
FIGS. 7A to 7D are sectional views showing various auxiliary tranfer passage arrangements tested during the evaluation of the third emboidment.
Figure 7B:
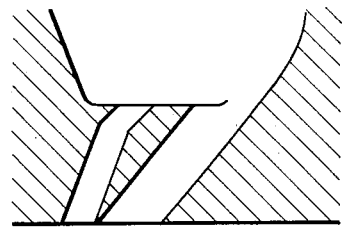
Figure 7C:
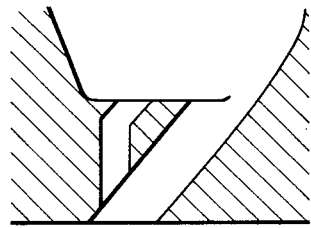
Figure 7D:
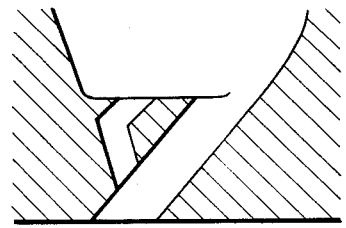
Figure 8:
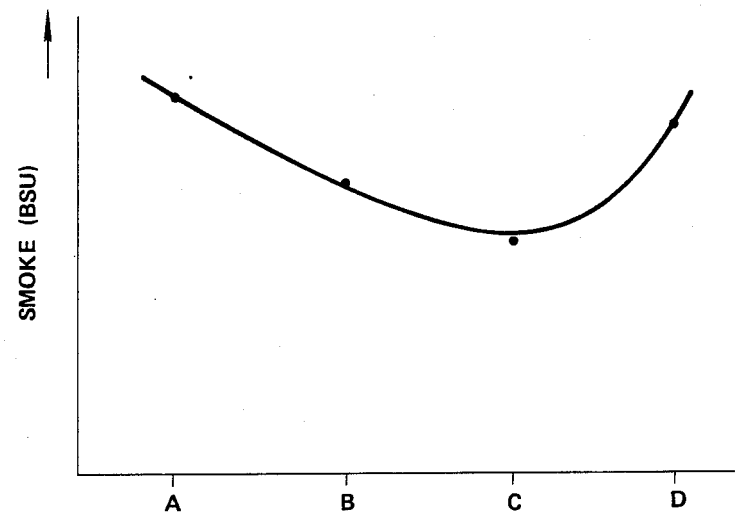
FIG. 8 graphically illustates in terms of smoke emission a comparison of the four arrangement illustrated in FIGS. 7A to 7D.
Figure 9:
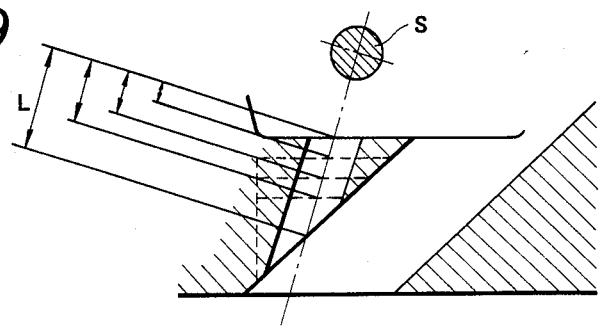
FIG. 9 shows in partial side section, dimensional parameters which effect the passage of fuel from the swirl chamber to the main combustion chamber and the wetting of the passage walls.

As will be appreciated the arrangement shown FIG. 7C produces the least amount of smoke. The reason for this is deemed to be that the arrangement shown in FIG. 7A tends to introduce the secondary flow B into ths swirl chamber in a manner which merely splits the main swirl, increases thermal loss and invites reduce combustion temperatures, while the arrangement shown in FIG. 7B appears to induce an insufficient increase in the flow path between the swirl and combustion chamber and thus produces a mediocre result as compared with the arrangement shown in FIG. 7C. On the other hand, it is thought the arrangement shown in FIG. 7D due to its acute bend is such as to induce a substantial pressure loss which inhibits the desired assist in the swirling motion produced by the main transfer port.

Figure 10:
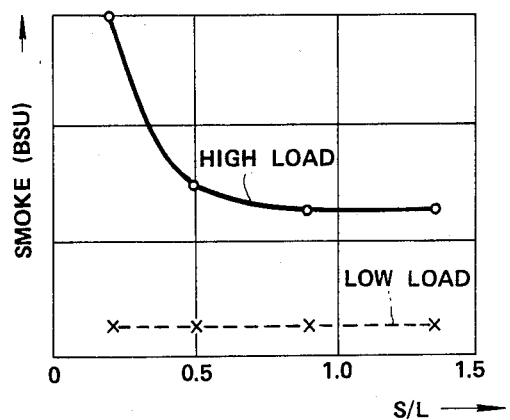
FIG. 10 is a graph showing in terms of smoke emission and the ratio of the auxiliary transfer passage cross section (area) to the passage length, the smoke emission characteristics obtained with present invention under light and heavy loads.
Figure 11:
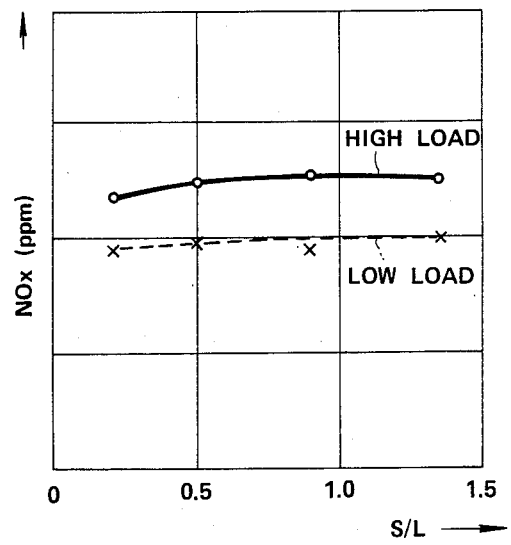
FIG. 11 is a graph shown in terms of NOx emission and the above mentioned cross sectional area/length ratio, the NOx emission characteristics obtainable with the present invention.

Further design parameters which have been found important when designing an engine of the nature of the present invention are the cross sectional area and the length of the auxiliary transfer port. Experiments have revealed that if the ratio of the cross sectional area of the auxiliary tranfer passage to the length of same (viz., S/L) is greater than 0.5 then, as shown in FIGS. 10 and 11, both the amount of smoke and NOx produced by the engine can be held a relatively low levels.

The reason for this phenomenon is that the amount of fuel which is permitted to reach the main combustion chamber varies as a function of the cross sectional area of the auxiliary transfer port. Accordingly, it is impossible to overly increase the diameter of the auxiliary tranfer port without encountering the problem that too much of the injected fuel is permitted to pass through the auxiliary passage and reach the main combustion chamber. As will be appreciated from the preceeding description, if too much fuel is permitted to enter the flame dispersing recess, wetting thereof is apt to occur and the fuel which adheres to the surface of the recess permitted to undergo slow combustion (in the presence of the little oxygen) and thus generate smoke and/or HC.

However, if the length of the auxiliary passage is too long, fuel tends to adhere to the downstream end (viz., the main combustion chamber end) thereof and induce the situation wherein the this fuel undergoes the above mentioned slow of "afterburning" phenomenon as it will be referred to. This problem is avoided by the use of the above mentined ratio.

In the last embodiment it will be noted that the cross section of the auxiliary tranfer port is essentially circular in shape. This tends to minimize the surface area available for fuel to adhere to.

What is claimed is:
1. In an internal combustion engine
    a cylinder bore;

a piston disposed in said cylinder bore in a manner to define a variable volume combustion chamber;

a swirl chamber, said swirl chamber formed by a cavity having two opposite essentially parallel flat sides bounded by a hemi-cylindrical wall portion, and a means for facilitating a turbulence, whereby said turbulence interferes with a main gas swirl;

a main transfer port providing fluid communication between said swirl chamber and said main combustion chamber, said main transfer port being arranged to lead the gas compressed in said combustion chamber during the compression phase of said engine tangentially into said swirl chamber so that the gas swirls in a predetermined rotational direction therein;

means defining a swirl chamber center axis, said center axis extending through a center portion of said swirl chamber parallel to said flat side walls and in a manner to intersect said hemi-cylindrical wall portion;

a fuel injector for injecting fuel into said swirl chamber, said fuel injector having an axis and arranged so that a fuel injection nozzle is located upstream of said center axis with respect to the direction in which the gas swirls in said swirl chamber;

an auxiliary transfer port leading from said main combustion chamber to said swirl chamber, said auxiliary transfer port having an axis which intersects the axis of said fuel injector at a point located within said swirl chamber on the downstream side of said center axis.

2. In an internal combustion engine
a cylinder bore;
a piston disposed in said cylinder bore in a manner to define a variable volume combustion chamber;
a swirl chamber, said swirl chamber formed by a cavity having two opposite essentially parallel flat sides bounded by a hemi-cylindrical wall portion, and a plug mouth ring having a circumference aligned with the essentially flat sides of said cavity;

a main transfer port providing fluid communication between said swirl chamber and said main combustion chamber, said main transfer port being arranged to lead the gas compressed in said combustion chamber during the compression phase of said engine tangentially into said swirl chamber so that the gas swirls in a predetermined rotational direction therein;

means defining a swirl chamber center axis, said center axis extending through a center portion of said swirl chamber parallel to said flat side walls and in a manner to intersect said hemi-cylindrical wall portion;

a fuel injector for injecting fuel into said swirl chamber, said fuel injector having an axis and arranged so that a fuel injection nozzle is located upstream of said center axis with respect to the direction in which the gas swirls in said swirl chamber;

an auxiliary transfer port leading from said main combustion chamber to said swirl chamber, said auxiliary transfer port having a ratio of cross sectional area to length of at least 0.5, said auxiliary transfer port having an axis which intersects the axis of said fuel injector at a point located within said swirl chamber on the downstream side of said center axis.

3. In an internal combustion engine
a cylinder bore;
a piston disposed in said cylinder bore in a manner to define a variable volume combustion chamber;
a swirl chamber, said swirl chamber having two opposite essentially parallel flat sides bounded by a hemi-cylindrical wall portion;

a main transfer port providing fluid communication between said swirl chamber and said main combustion chamber, said main transfer port being arranged to lead the gas compressed in said combustion chamber during the compression phase of said engine tangentially into said swirl chamber so that the gas swirls in a predetermined rotational direction therein;

means defining a swirl chamber center axis, said center axis extending through a center portion of said swirl chamber parallel to said flat side walls and in a manner to intersect said hemi-cylindrical wall portion;

a fuel injector for injecting fuel into said swirl chamber, said fuel injector having an axis and arranged so that a fuel injection nozzle is located upstream of said center axis with respect to the direction in which the gas swirls in said swirl chamber;

an auxiliary transfer port leading from said main combustion chamber to said swirl chamber, said auxiliary transfer port having an axis which intersects the axis of said fuel injector at a point located within said swirl chamber on the downstream side of said center axis.

4. An internal combustion engine as claimed in claim 3, wherein the cross section of said auxiliary transfer port is essentially circular in shape.

5. An internal combustion engine as claimed in claim 3, further comprising a flame dispersing recess formed in the crown of said piston, said recess comprising:
an elongate trench; and
first and second essentially circular flame dispersing sections located on either side of said trench, said trench having a first deep end located in proximity of said main transfer port and arranged so that the deepest section thereof is located so as to be alinged with an extrapolation of the axis of said auxiliary tranfer port when said piston is essentially at its TDC position, said trench tapering to a shallow second end which has a depth approximately equal to said essentially circular flame dispersing portions.

6. An internal combustion engine as claimed in claim 5, wherein said recess further comprises a rounded wall section located at the second end of said trench, said rounded wall section being arranged to split the flame which flows along said trench and cause same to curl toward said flame dispersing sections.

* * * * *